July 31, 1934.   W. E. BOBERTZ   1,968,632
CONTROL SYSTEM
Filed Oct. 14, 1932   2 Sheets-Sheet 1

WITNESSES:
Leon J. Taza
F. J. Hicks

INVENTOR
Walter E. Bobertz.
BY
ATTORNEY

July 31, 1934.  W. E. BOBERTZ  1,968,632
CONTROL SYSTEM
Filed Oct. 14, 1932   2 Sheets-Sheet 2

WITNESSES:
Leon J. Taza
F. J. Hicks

INVENTOR
Walter E. Bobertz.
BY
ATTORNEY

Patented July 31, 1934

1,968,632

UNITED STATES PATENT OFFICE 1,968,632

CONTROL SYSTEM

Walter E. Bobertz, Detroit, Mich., assignor to Westinghouse Electric & Manufacturing Company, East Pittsburgh, Pa., a corporation of Pennsylvania Application October 14, 1932, Serial No. 637,761

5 Claims. (Cl. 175—363)

My invention pertains to control systems and more particularly it relates to control systems wherein the voltage applied to the load is varied by shifting the phase relation of the alternating current potentials applied to the control grids of electronic discharge devices.

In the use of such systems various difficulties have been previously encountered such as abrupt changes in load voltage which occur when the phase-shift control is gradually adjusted to regulate the load voltage. Also poor voltage regulation has been experienced under certain conditions.

It is accordingly an object of my invention to provide a grid controlled tube system which will have the very desirable characteristics of smooth voltage control and good voltage regulation.

It is also an object of my invention to provide a control system utilizing electronic discharge devices wherein the voltage on the load varies gradually or uniformly as the phase relation of the alternating current control grid potential is shifted relative to the alternating current potential applied to the plate.

Another object of my invention is to provide a grid phase-shift tube control system which has improved voltage regulation characteristics.

The invention itself, however, both as to its organization and its method of operation, together with additional objects and advantages thereof, will best be understood from the following description of specific embodiments when read in connection with the accompanying drawings, in which.

Figure 1:
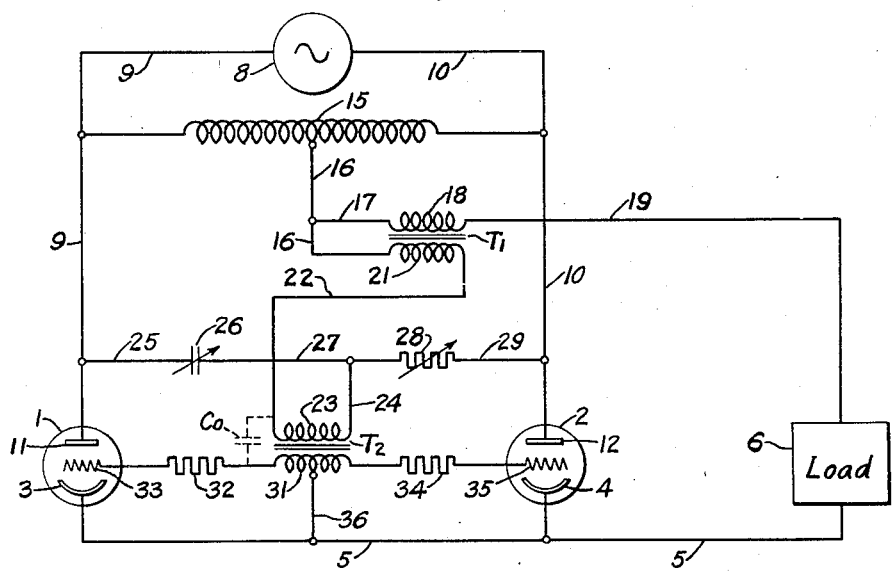
Figure 1 is a diagrammatic view representing a grid phase-shift tube control system arranged in accordance with one embodiment of my invention.

Referring more specifically to the drawings, the apparatus shown in Fig. 1 comprises a pair of electronic discharge tubes 1 and 2 having their cathodes 3 and 4 joined by an interconnecting conductor 5 which also extends to one side of a load 6 which may be any energy consuming device such as an electric motor, or a bank of lamps in a theatre, the energization of which is to be controlled and varied by the control system. The input circuit extends from any main alternating current supply source 8 through conductors 9 and 10 which are connected to the anodes 11 and 12 of the tubes 1 and 2 respectively.

Connected between the main supply conductors 9 and 10 is a center tapped reactor coil 15. The load circuit extends from the center of said reactor by way of conductors 16 and 17, the primary winding 18 of a balancing transformer $T_1$ and through conductor 19 to the other side of the load 6. The purpose of the balancing transformer will be subsequently set forth.

From the center tap of reactor coil 15 the conductor 16 also extends through a grid control circuit comprising the secondary winding 21 of the balancing transformer $T_1$, thence by way of conductor 22 to one terminal of the primary winding 23 of a grid control transformer $T_2$. The other terminal of the primary winding 23 is connected by conductor 24 to the center conductor 27 of a phase shifting network comprising conductor 25, condenser 26, conductor 27, resistor 28 and conductor 29 connected in series relation across the main line conductors 9 and 10. Either condenser 26 or resistor 28 or both are adjustable.

The grid control transformer $T_2$ has a center tapped secondary winding 31 one terminal of which is connected, through a resistor 32, to the control grid 33 of the first tube 1, the other terminal being connected through a resistor 34 to the control grid 35 of the second tube 2. The center tap of the secondary winding is connected by a conductor 36 to the cathode conductor 5 and thence to the cathodes 3 and 4 of both tubes.

In the operation of such a control system either tube 1 or 2 will not pass current until a certain predetermined break-down potential has been applied to the corresponding control grid. When this predetermined voltage has been applied to either control grid, the corresponding tube breaks down and passes current during the remainder of that particular half cycle. By means of the grid transformer $T_2$ a breakdown potential is applied alternatively to the control grids 33 and 35 during the half cycles when the respective corresponding tube anodes are positive.

Hence, the tubes alternately break down and pass current which flows in the load circuit 19, 6, 5 as a succession of direct current impulses.

By controlling the instant when the breakdown voltage is applied to the grids, it is possible to cause the tubes to break down at any particular phase instant, and to alternately pass current during only a certain predetermined portion of each successive half cycle. In this manner, the voltage applied to the load circuit may be controlled.

The phase-shift of grid-voltage control is readily accomplished by varying either the condenser 26, or the resistor 28, of the phase shifting network through which the grid energizing transformer T2 is energized. The phase of the potentials applied to the grids 33 and 35 is in this manner varied to have any predetermined phase relation to the potentials applied to the plates 11 and 12, and the tubes will consequently break down and pass current only during the portion of each cycle thus selected.

The operation of such systems has been unsatisfactory, since the output voltage does not vary smoothly throughout the entire range but varies suddenly and abruptly during a certain range of control. Such fluctuations are very annoying especially when the system is used for theater dimming or motor speed control. This condition is caused by the capacity between the windings of the grid control transformer T2, which is represented by the symbol Co shown in dotted lines in Fig. 1. When it is considered that the transformer T1 is omitted in the usual rectifier system, it will be seen that the capacity between the windings of the grid transformer T2 completes a circuit which may be traced from the load 6 through the conductors 19, 16, 22, Co, a portion of winding 31 and conductors 36 and 5 to the other side of the load.

Hence, any alternating current component in the direct current load voltage will cause a feedback current to flow through a portion of the grid control circuit and will produce an impedance drop Ez which is applied to the grid of the tube and its cathode. At the load voltage at which the current jump usually occurs, the impedance voltage Ez is mainly a second harmonic frequency of the supply-voltage frequency. Other harmonics are also present. The presence of the harmonic voltage Ez, which is superposed on the control grid voltage, causes the latter to vary abruptly and renders the control of the rectifier difficult.

In accordance with my invention I insert the primary winding 18 of the balancing transformer T1 in the direct-current load circuit, and the secondary winding 21 of the transformer is connected into the grid control circuit. The alternating-current component in the direct current load circuit then sets up compensating alternating current potentials in the transformer secondary winding 21 which, being properly interposed in the said control circuit, balances out the feed back current and eliminates the impedance drop Ez. Care must be taken to connect the secondary winding in the grid control circuit in such a manner that its induced potentials will oppose rather than aid or increase the impedance drop Ez. The balancing transformer may be designed to provide a compensating voltage of proper magnitude for any particular rectifier system, or a multitap transformer may be used to facilitate precise balancing. The voltage regulation of the system is also improved by balancing out the impedance drop in the grid control circuit.

Figure 2:
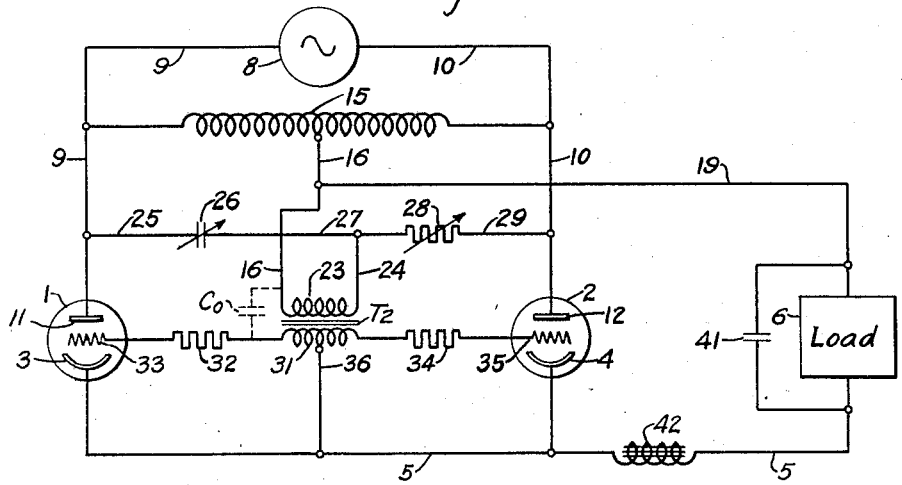
Fig. 2 is a diagrammatic view representing a similar system arranged in accordance with another embodiment of my invention.

In accordance with another embodiment of my invention, as shown in Fig. 2, I provide a large by-pass condenser 41 connected in shunt with the load 6. This arrangement provides a comparatively low impedance path for the alternating current component in the direct current circuit and the impedance drop Ez is thereby diminished. For this purpose a condenser of about 3 micro-farads has been satisfactory.

The difficulties caused by the alternating current component in the load circuit may also be eliminated by decreasing the alternating current feed-back current by inserting an inductive reactance 42 in series with the circuit through the transformer capacity Co, as shown in Fig. 2.

Figure 3:
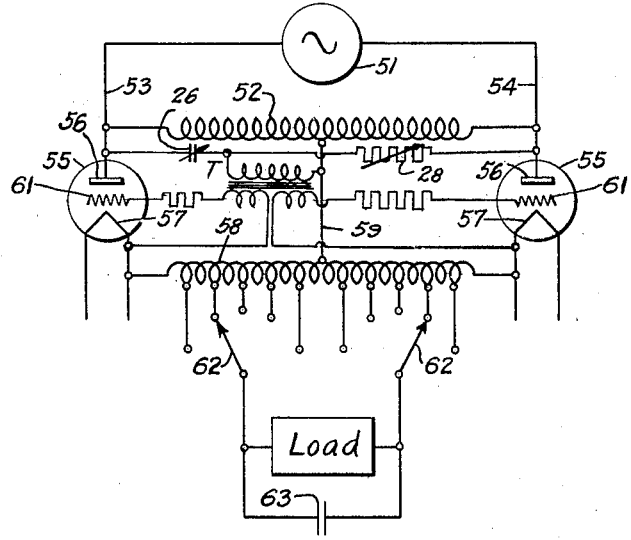
Figs. 3, 4, and 5 are diagrammatic views representing various grid phase-shift tube control systems to which my invention is applicable.

In the control system represented in Fig. 3 an alternating current source 51 is connected to a center tapped reactor coil 52 by conductors 53 and 54. A pair of electronic discharge tubes 55 are provided having their anodes 56 connected to the respective terminals of the reactor coil 52. The cathodes 57 of the tubes 55, which may be supplied with heating current in any convenient manner, are connected to the respective terminals of a multi-tap reactor coil 58, which is also provided with a center tap. The center taps of the two reactor coils 52 and 58 are connected together by a conductor 59.

Each tube is provided with a control grid 61 to which controlling potentials may be applied, in any well known manner, as by any well known phase shifting devices such as artificial lines of adjustable length or locked rotor devices angularly adjustable, to control the time during each cycle when breakdown will occur, and hence the portion of each current wave which will be passed by the tube. In this embodiment the same phase shifting network may be used as in the previous embodiments comprising a variable condenser 26 and a variable resistor 28 connected between the plates of the tubes. Suitable transformer means T couples the phase shifting network to the respective grids 61 through separate secondary windings.

Associated with the various taps of the multi-tap reactor coil 58 are a pair of adjustable connectors 62 from which the alternating current load circuit extends by way of conductors to any load which is to be energized therefrom. By varying the adjustable connectors 62 the load voltage may be varied in a manner supplemental to the usual method of varying the grid potentials.

In accordance with my invention it is desirable to reduce the detrimental effect of the various harmonics and high frequency disturbances by providing a suitable by-pass condenser 63 in shunt with the load. Such a condenser is especially effective in diminishing the impedance of the load circuit to high frequency currents. If preferred, a transformer may be inserted in the load circuit to apply compensating potentials in the grid circuit in accordance with the embodiment of my invention disclosed in Fig. 1. Such a transformer is preferably designed to be more efficient for transmitting the higher frequencies and to offer low impedance to power current at 60 cycles.

Figure 4:
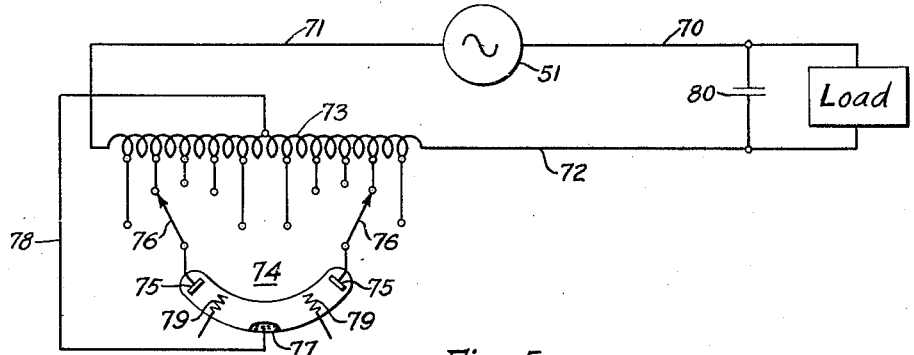

In Fig. 4, an alternating current load is energized from an alternating current source 51 by a circuit comprising conductors 70, 71 and 72 and a reactance coil 73 which limits the energization of the load. A double electronic discharge device 74 is provided having a pair of anodes 75 which are connected through suitable switching devices 76 to various taps on the reactor coil 73. The cathode 77 of the discharge device 74 is connected through a conductor 78 to a center tap on the coil 73. The discharge device serves to shunt current around a portion of the reactor coil 73 in one direction during half of each cycle and around another portion of the coil in the opposite direction during the other half of each cycle, thereby diminishing the impedance of the coil in the circuit and increasing the energization of the load. The discharge device is provided with control grids 79 by which the by-passed current may be controlled and varied in the well known manner. A by-pass condenser 80 may be connected in shunt with the load for minimizing the effect of harmonics and other high frequency disturbances in feeding back on the control grid circuit.

Figure 5:
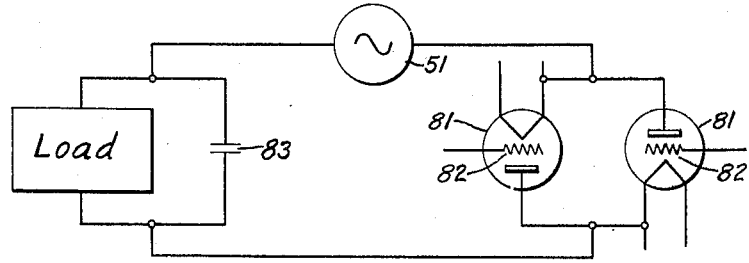

Where, as shown in Fig. 5, the current for an alternating current excited load is supplied through a pair of oppositely connected discharge devices 81, each of which passes alternate half cycles in opposite directions, the alternating current load current may be controlled by applying various control potentials to the control grids 82 of the discharge devices, in any well known manner. In such a system the voltage characteristics may also be improved, in accordance with my invention, by providing a by-pass condenser 83 to lower the impedance of the load circuit to the higher frequencies. It is also within the scope of my invention to eliminate the undesirable harmonics and high frequency disturbances by impressing compensating potentials on the grid control potentials by a properly designed transformer energized from the load circuit, in a manner similar to that previously disclosed with reference to Fig. 1.

It will be seen that by providing means for balancing out various disturbing influences I have been enabled to devise various grid potential phase shift tube control systems which have the desirable characteristics of smooth voltage control and improved voltage regulation.

Although I have shown and described certain specific embodiments of my invention, I am fully aware that many modifications thereof are possible. My invention, therefore, is not to be restricted except as necessitated by the prior art and the scope of the appended claims.

I claim as my invention:

1. In combination with a grid phase-shift tube control system comprising grid controlled gaseous discharge rectifier tubes, an alternating current source, means connected to said source for applying alternating potentials to the anodes of said tubes, a potential divider between said anodes, a load circuit connected between the cathodes of said tubes and an equal potential point on the potential divider between said anodes, means connected to said source for applying break-down potentials directly between the control grids and cathodes of the rectifier tubes, adjustable means for varying the phase instant when the break-down potentials are applied to said grids relative to the potentials applied to the anodes, and means for balancing out of the grid control circuit the feed-back effect of the harmonics and high frequency disturbances in the load circuit.

2. In combination with a grid phase-shift tube control system comprising grid controlled gaseous discharge rectifier tubes, an alternating current source, means connected to said source for applying alternating potentials to the anodes of said tubes, a potential divider between said anodes, a load circuit connected between said cathodes and an equal potential point on the potential divider between said anodes, means connected to said source for applying break-down potentials to the control grids of the tubes, adjustable means for varying the phase instant when the break-down potentials are applied to said grids relative to the potentials applied to the anodes, and a transformer having one winding connected in the load circuit and a second winding connected in the control grid circuit for balancing out of the control circuit the feed-back effect of the alternating current harmonics and high frequency disturbances in the load circuit.

3. In combination with a grid phase-shift tube control system comprising grid-controlled gaseous discharge rectifier tubes, an alternating current source, means connected to said source for applying alternating potentials to the anodes of said tubes, a potential divider between said anodes, a load circuit connected between the cathodes of said tubes and an equal potential point on said divider, a transformer energized from said alternating current source for applying break-down potentials to the control grids of said tubes, and impedance means in series with the grid transformer winding capacity circuit for minimizing the effect of said capacity circuit in conducting alternating current feed back currents.

4. In combination with a grid phase-shift tube control system comprising grid controlled gaseous discharge rectifier tubes, an alternating current source, means connected to said source for applying alternating potentials to the anodes of said tubes, a motor to be controlled, means energized from said source for applying break-down potentials directly between the control grids and cathodes of said tubes, adjustable means for varying the phase instant when said breakdown potentials are applied relative to the potentials applied to the anodes, and means for eliminating the feed back effect of the alternating current component in the output circuit whereby the output voltage may be varied gradually as desired.

5. A grid phase-shift tube control system comprising a grid controlled gaseous discharge rectifier tube, an alternating current source, means energized from said source for applying alternating potentials to the anode of said tube, means energized from said source for applying break-down potentials to the grid of said tube, manually adjustable means for varying the phase instant when the break-down potentials are applied to the grid relative to the potentials applied to the anode, a load connected to be energized in the anode circuit of said tube, and means for balancing out of the grid control circuit the feed-back effect of the harmonics and high frequency disturbances in the load current whereby the load current may be varied uniformly and gradually over its entire range.

WALTER E. BOBERTZ.